United States Patent
Wang

(10) Patent No.: US 7,147,454 B2
(45) Date of Patent: Dec. 12, 2006

(54) OPTICAL LENS MOLDING APPARATUS AND PRECISION MOLDING APPARATUS

(75) Inventor: Kun-Chih Wang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 31 days.

(21) Appl. No.: 10/905,802

(22) Filed: Jan. 21, 2005

(65) Prior Publication Data

US 2006/0073232 A1    Apr. 6, 2006

(30) Foreign Application Priority Data

Oct. 4, 2004   (TW) ............................... 93129966 A

(51) Int. Cl.
*B29D 11/00* (2006.01)
(52) U.S. Cl. ...................... 425/408; 425/411; 425/808; 425/812; 65/305
(58) Field of Classification Search ................ 425/408, 425/411, 812, 808; 100/258 A; 65/305, 65/322
See application file for complete search history.

(56) References Cited

U.S. PATENT DOCUMENTS

| | | | | |
|---|---|---|---|---|
| 4,895,585 A | * | 1/1990 | Angenent et al. ............... 65/39 |
| 4,964,903 A | * | 10/1990 | Carpenter et al. ............ 65/275 |
| 5,616,161 A | * | 4/1997 | Morikita ....................... 65/157 |
| 2003/0056544 A1 | * | 3/2003 | Yamanaka ................... 63/305 |

FOREIGN PATENT DOCUMENTS

JP    61-174127    * 8/1986

OTHER PUBLICATIONS

English abstract for JP 61-174127.*

* cited by examiner

*Primary Examiner*—Donald Heckenberg
(74) *Attorney, Agent, or Firm*—Jiang Chyun IP Office

(57) ABSTRACT

An optical lens molding apparatus includes a cylindrical mold, a first mold core, a second mold core and a correctional ring. The first and the second mold core have a columnar shape and are disposed inside the cylindrical mold to form a cavity. Furthermore, the first and the second mold core have a planar portion at the end surface facing the cavity. The correctional ring is disposed on the planar portion of the second mold core. The correction ring corrects any face tilting of the molded optical lens due to the tilting of the first mold core. The present invention also provides a precision molding apparatus for forming precision parts.

18 Claims, 6 Drawing Sheets

OPTICAL LENS MOLDING APPARATUS AND PRECISION MOLDING APPARATUS

CROSS-REFERENCE TO RELATED APPLICATION

This application claims the priority benefit of Taiwan application serial No. 93129966, filed Oct. 4, 2004.

BACKGROUND OF THE INVENTION

1. Field of the Invention

The present invention relates to a molding apparatus. More particularly, the present invention relates to a molding apparatus for molding optical lenses and precision mold objects having the least face-tilting problem.

2. Description of the Related Art

With the rapid development of electronic technologies in recent years, the functions of various type of optical electronic products including cameras, digital cameras, camcorders, facsimiles, printers, optical disc players, scanners and projectors continue to improve while their prices continue to drop. These electronic products are so popular that they have almost become indispensable to us in out daily life.

Most optical products have at least one precision optical device that incorporates an optical lens, for example. Optical lenses can be roughly divided into spherical lenses and aspheric lenses. At present, most spherical optical lenses are fabricated by grinding while most aspheric lenses are fabricated by molding.

FIG. 1 is a schematic cross-sectional view showing the structure of a conventional molding apparatus for molding optical lenses. As shown in FIG. 1, a conventional lens molding apparatus 100 mainly comprises a cylindrical mold 110 and an internal cavity 150 formed by an upper mold core 120 and a lower mold core 130. A gob is disposed inside the mold cavity 150. Through a process of heating the mold to a high temperature, the gob is softened and molded into the required shape. After a period of cooling, an optical lens 54 is formed inside the mold. In the process of converting the gob into a molded lens 54, the central axis C1 of the upper mold core 120 and the central axis C2 of the lower mold core 130 are theoretically collinear. Furthermore, the planar portion 122 of the upper mold core 120 should be parallel to the planar portion 132 of the lower mold core 130 so that the surface of the ultimately formed optical lens 54 has no face tilting.

However, manufacturing tolerance must be allowed in fabricating the mold core and the mold so that the two can fit into each other with ease. In general, the tolerance is set between 5~20 μm. FIG. 2 is a schematic cross-sectional view showing the structure of a conventional molding apparatus during the molding process. As shown in FIG. 2, a gap 160 is formed in the space between the upper mold core 120, the lower mold core 130 and the cylindrical mold 110. This gap 160 causes some degree of tilting in the upper mold core 120 when assembled into the cylindrical mold 110 so that the central axis C1 of the upper mold core 120 forms an included angle θ with the central axis C2 of the lower mold core 130. In other words, the planar portion 122 of the upper mold core 120 is no longer is parallel to the planar portion 132 of the lower mold core 130. Consequently, the molded optical lens 54' will have face-tilting problem.

SUMMARY OF THE INVENTION

Accordingly, at least one objective of the present invention is to provide an optical lens molding apparatus for fabricating a precise optical lens with minimal face tilting.

At least a second objective of the present invention is to provide a molding apparatus for forming a mold object having very little face tilting.

To achieve these and other advantages and in accordance with the purpose of the invention, as embodied and broadly described herein, the invention provides an optical lens molding apparatus. The optical lens molding apparatus comprises a cylindrical mold, a first mold core, a second mold core and a correctional ring. The first mold core has a columnar shape and is disposed inside the cylindrical mold. The second mold core also have a columnar shape and is disposed inside the cylindrical mold to face the first mold core. The first and the second mold core together with the cylindrical mold form a mold cavity. Furthermore, the first and the second mold core have a planar portion at the end surface facing the cavity. The correctional ring is disposed on the planar portion of the second mold core.

The present invention also provides a precision molding apparatus for forming a mold object. The molding apparatus comprises a mold assembly, a first mold core, a second mold core and a correctional pad. The second mold core faces the first mold core. Furthermore, the first mold core, the second mold core and the mold assembly together form a mold cavity. The correctional pad is disposed inside the mold cavity between the first mold core and the second mold core and has a coefficient of thermal expansion larger than the mold object, the first mold core and the second mold core. In the process of forming the mold object, the two end faces of the correctional pad are in contact with the mold cavity end of the first mold core and the second mold core respectively.

Because the optical lens molding apparatus of the present invention has a correctional ring, any tilting in the mold core during a molding process can be easily correct to minimize the tilting of the central axis of the lens. The thickness of the correctional ring is also utilized to control the central thickness of the lens. Furthermore, the higher coefficient of thermal expansion of the correctional ring is utilized to imprint the surface of the lens a second time in the process of cooling the lens. In addition, the correctional pad inside the precision molding apparatus provides an effective means of correcting the surface profile of a mold object to produce a surface precise mold product.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
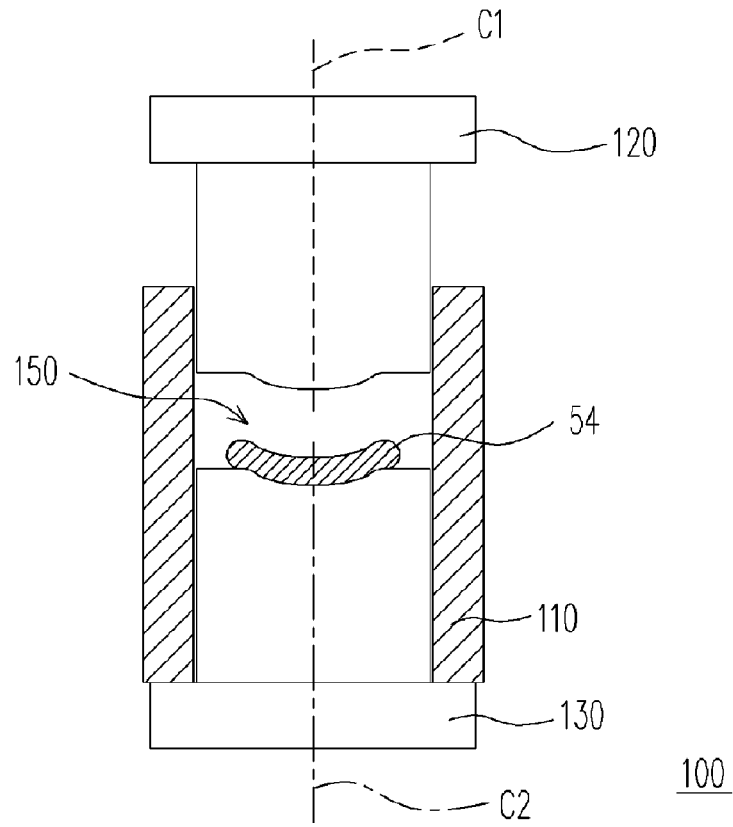
FIG. 1 is a schematic cross-sectional view showing the structure of a conventional molding apparatus for molding optical lenses.
Figure 2:
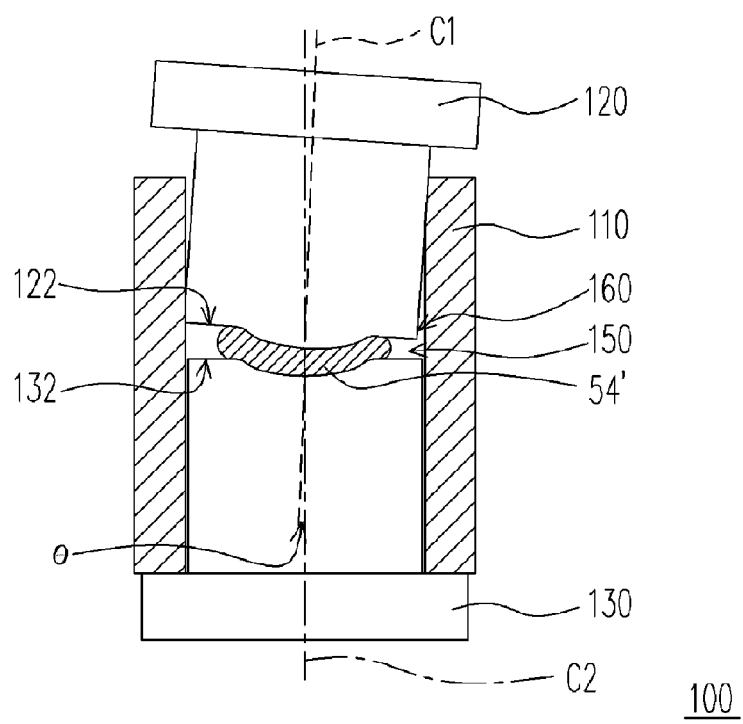
FIG. 2 is a schematic cross-sectional view showing the structure of the conventional molding apparatus in FIG. 1 during a molding process.

Reference will now be made in detail to the present preferred embodiments of the invention, examples of which are illustrated in the accompanying drawings. Wherever possible, the same reference numbers are used in the drawings and the description to refer to the same or like parts.

Figure 3:
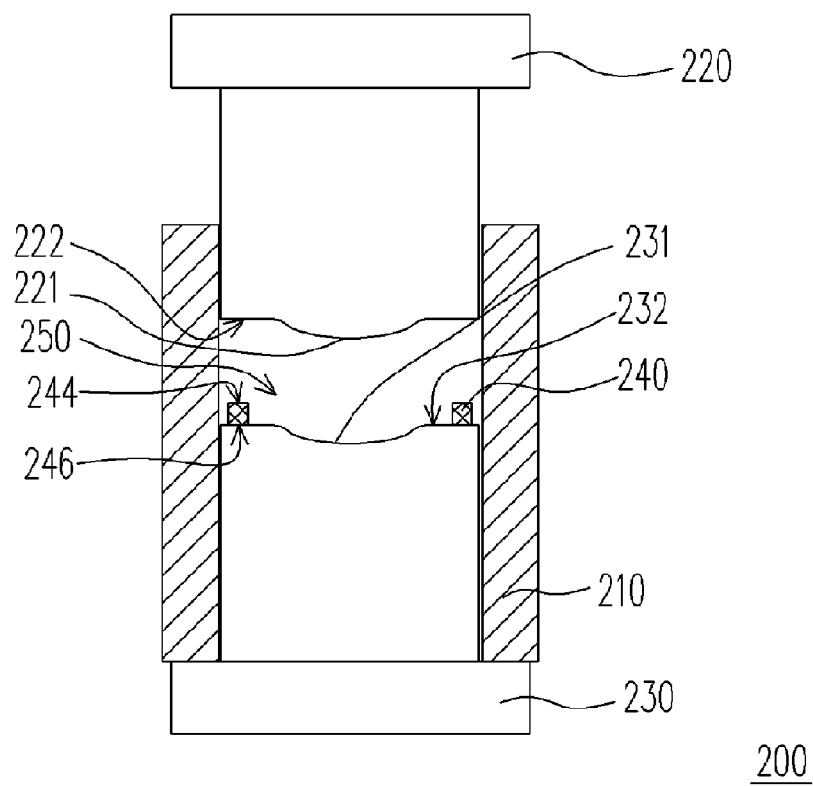
FIG. 3 is a schematic cross-sectional view showing the structure of an optical lens molding apparatus according to the present invention.

FIG. 3 is a schematic cross-sectional view showing the structure of an optical lens molding apparatus according to the present invention. The optical lens molding apparatus of the present invention is mainly used to convert a molding material into an optical lens. In general, the molding material is glass or optical polymers. In the present embodiment, the molding material is a gob although other substances can be used. As shown in FIG. 3, the present embodiment provides an optical lens molding apparatus 200 for forming an optical lens (not shown) in a molding process. The optical lens molding apparatus 200 comprises a cylindrical mold 210, an upper mold core 220, a lower mold core 230 and a correctional ring 240. The upper mold core 220 has a columnar shape with an end surface comprising an upper molding portion 221 and a planar portion 222 around the upper molding portion 221. The upper mold core 220 is disposed within the cylindrical mold 210. The lower mold core 230 also has a columnar shape with an end surface comprising a lower molding portion 231 and a planar portion 232 around the lower molding portion 231. The lower mold core 230 is similarly disposed within the cylindrical mold 210. The correctional ring 240 is disposed on the planar portion 232 of the lower mold core 230 so that the molding portion 221, 231 of the upper mold core 220 and the lower mold core 230 are set up inside the cylindrical mold 210 facing each other. In other words, a mold cavity 250 is formed inside the cylindrical mold 210.

Figure 4:
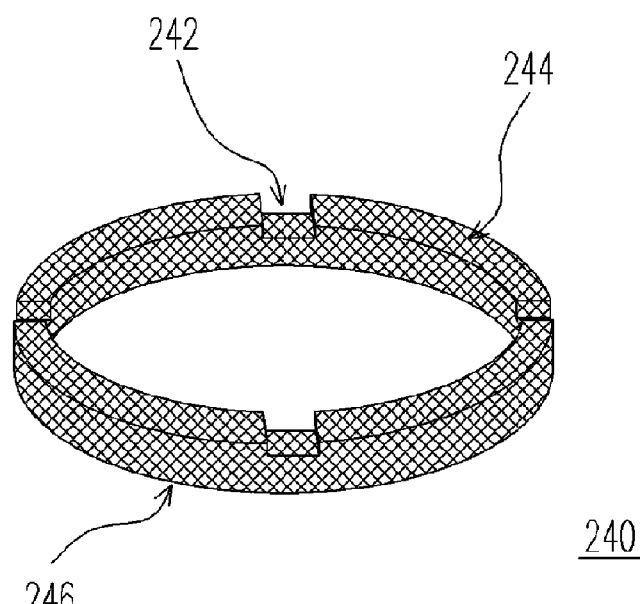
FIG. 4 is a perspective view of a correctional ring according to the present invention.

FIG. 4 is a perspective view of a correctional ring according to the present invention. As shown in FIGS. 3 and 4, the correctional ring 240 in the present embodiment can be fabricated using a metallic material or an alloy material. The alloy material includes stainless steel such as SUS316 or SUS310. Furthermore, the correctional ring 240 has a coefficient of thermal expansion higher than the optical lens, the upper mold core 220 and the lower mold core. The correctional ring 240 has an inner diameter greater than the outer diameter of the optical lens (not shown) to prevent the molded optical lens from adhering to the correctional ring 240. Moreover, the outer diameter of the correctional ring 240 is smaller than the inner diameter of the cylindrical mold 210 to prevent an axial deformation of the correctional ring 240 resulting from touching the cylindrical mold 210 due to heat expansion. Furthermore, the correctional ring 240 has four gas-bleeding trenches 242 disposed on the edge away from the end surface 244 of the lower mold core 230 to facilitate the exhaust of residual gases from the mold cavity 250. Although four gas-bleeding trenches 242 are used in the present embodiment, the actual number of gas-bleeding trenches 242 set up on the edge of the correction ring 240 can be more than or less than four.

Figure 5A:
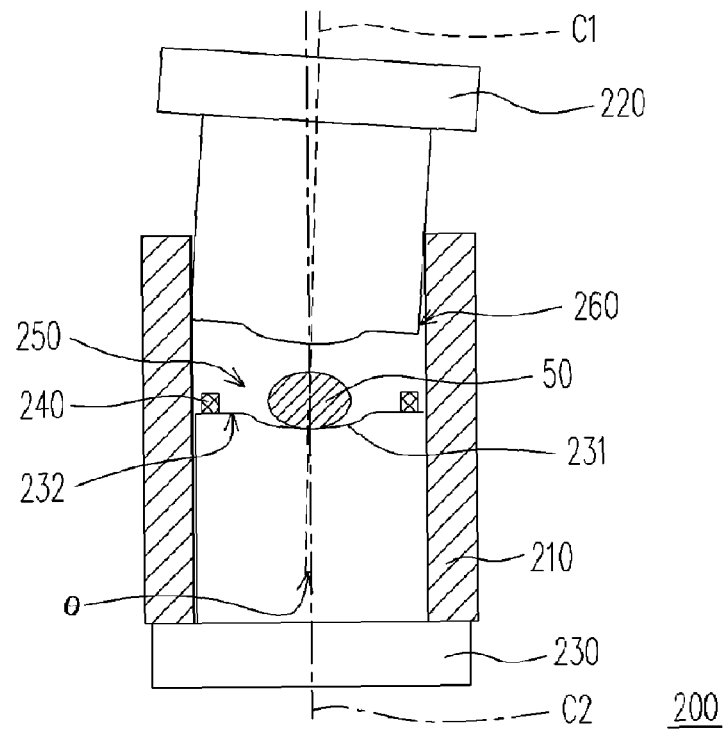
FIGS. 5A through 5C are schematic cross-sectional views showing various steps in the process of forming an optical lens using the optical lens molding apparatus of the present invention.
Figure 5B:
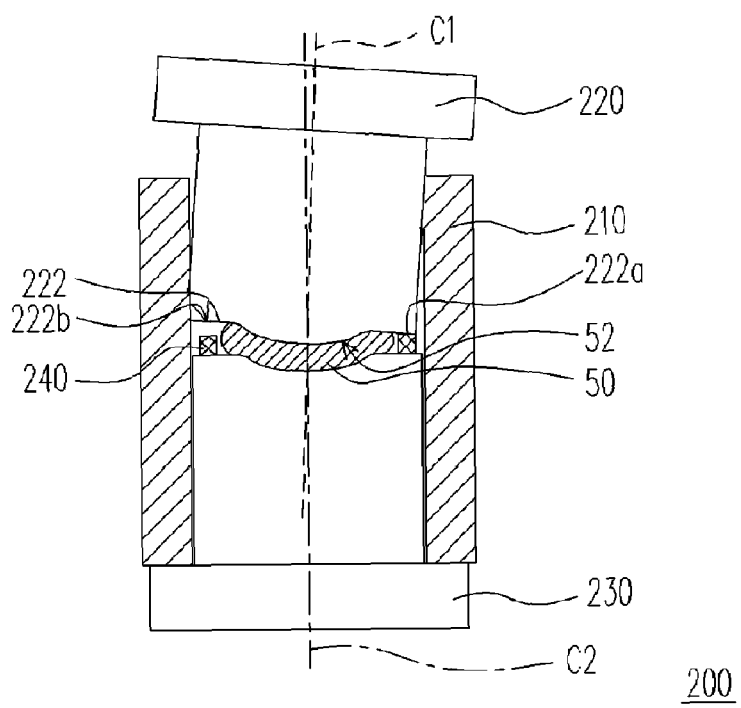
Figure 5C:
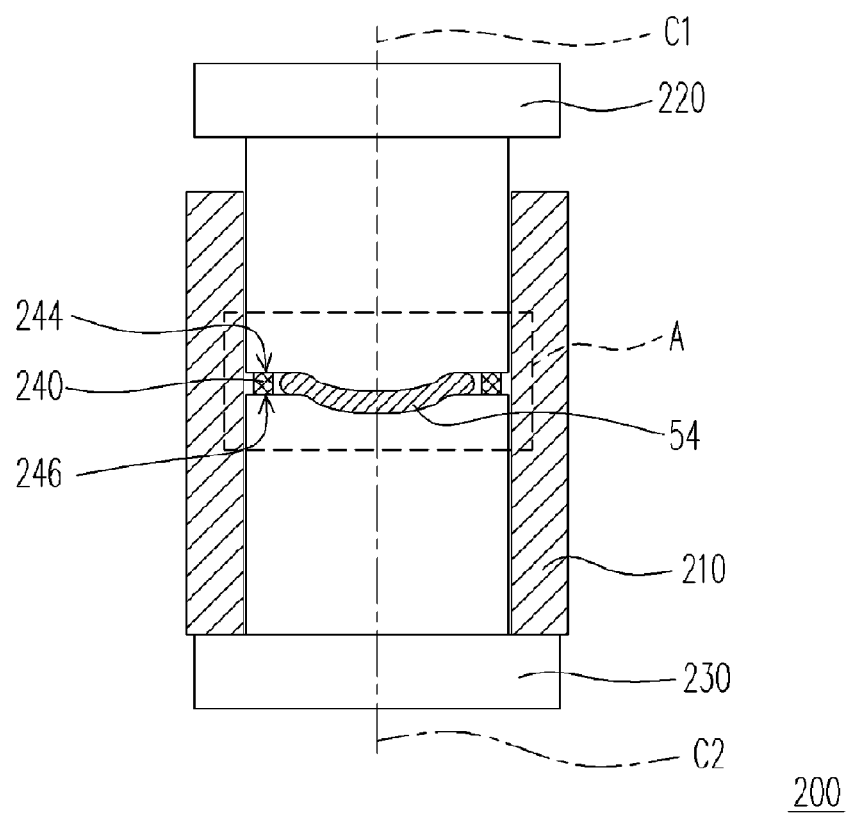

FIGS. 5A through 5C are schematic cross-sectional views showing various steps in the process of forming an optical lens using the optical lens molding apparatus of the present invention. As shown in FIG. 5A, the lower mold core 230 is slide into the cylindrical mold 210 and the correctional ring 240 is set up on the planar portion 232 of the lower mold core 230. Thereafter, a gob 50 is disposed near the center of the lower molding portion 231. After that, the upper mold core 220 is inserted into the cylindrical mold 210 above the lower mold core 230 to form a mold cavity 250. Due to machining tolerance, there is a gap 260 between the upper mold core 220, the lower mold core 230 and the cylindrical mold 210. In general, the gap 260 has a width of between 5~20 μm so that the upper mold core 220 and the lower mold core 230 can easily slide into the cylindrical mold 210. However, the presence of the gap 260 may lead to a slight tilting of the upper mold core 220 so that the central axis C1 of the upper mold core 220 form an included angle θ with the central axis C2 of the lower mold core 230.

As shown in FIG. 5B, the gob 50 begin to deform when the upper mold core 220 presses down slowly. Due to the tilt in the upper mold core 220, the contact surface 52 at the interface between the glass 50 and the upper mold core 220 also forms a tilt. However, when the lowest point 222a of the planar portion of the upper mold core 220 contacts the correctional ring 240, the downward movement is stopped by the correctional ring 240. In the meantime, the downward movement of the higher point 222b of the planar portion of the upper mold core 220 continues unimpeded until the high point 222b of the planar portion of the upper mold core 220 also rests on the correctional ring 240.

As shown in FIG. 5C, the included angle θ (as shown in FIG. 5A) between the central axis C1 of the upper mold core 220 and the central axis C2 of the lower mold core 230 disappears when the entire planar portion 222 of the upper mold core 220 rests on the correctional ring 240. At the end of the molding process, an optical lens 54 having no surface tilting or very little surface tilting is produced. In other words, the correctional ring 240 is able to correct the tilting of the upper mold core 220. It should be noted that the degree of surface tilting in the optical lens 54 is directly related to the precision of fabrication of the correctional lens 240. Hence, the planarity and parallel alignment of the surfaces of the correctional ring 240 is critical. Therefore, the present embodiment needs to provide some specification for limiting the degree of variation from a perfect parallel alignment between the end surfaces 244 and 246 of the correctional ring 240 so that face tilting in the molded optical lens is minimized.

Figure 6:
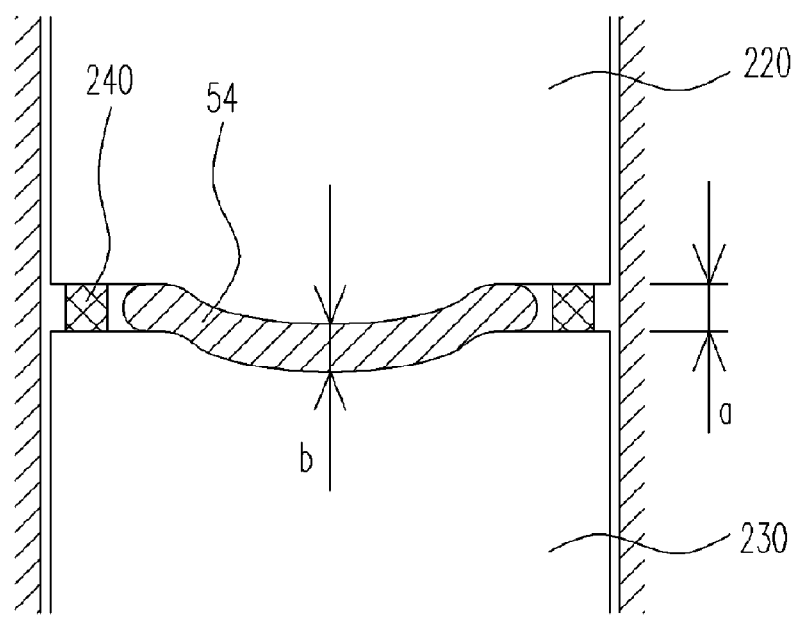
FIG. 6 is a partially magnified view of area 'A' in FIG. 5C.

FIG. 6 is a partially magnified view of area 'A' in FIG. 5C. As shown in FIG. 6, the thickness 'a' of the correctional ring 240 determines the central thickness of the molded glass 50 after the molding process. In other words, the central thickness 'b' of the molded optical lens 54 is almost equal to the central thickness 'a' of the correctional lens 240. Therefore, the thickness 'a' of the correctional ring 240 is designed according to the desired central thickness 'b' of the optical lens 54 so that the thickness 'a' of the correctional ring 240 can be used to control the central thickness of the gob 50 with great precision.

Furthermore, the coefficient of thermal expansion of the correctional ring 240 is greater than the optical lens 54, the upper mold core 220 and the lower mold core 230. Hence, the degree of contraction in the correctional ring 240 is larger than the optical lens 54, the upper mold core 220 and the lower mold core 230 in the cooling process. Therefore, the upper mold core 220 will continue to provide a pressure within the mold cavity when the correctional ring 240 contracts so that a secondary surface imprint effect is produced and mold contraction is minimized. Ultimately, the transfer precision of the optical lens 54 is improved.

Figure 7:
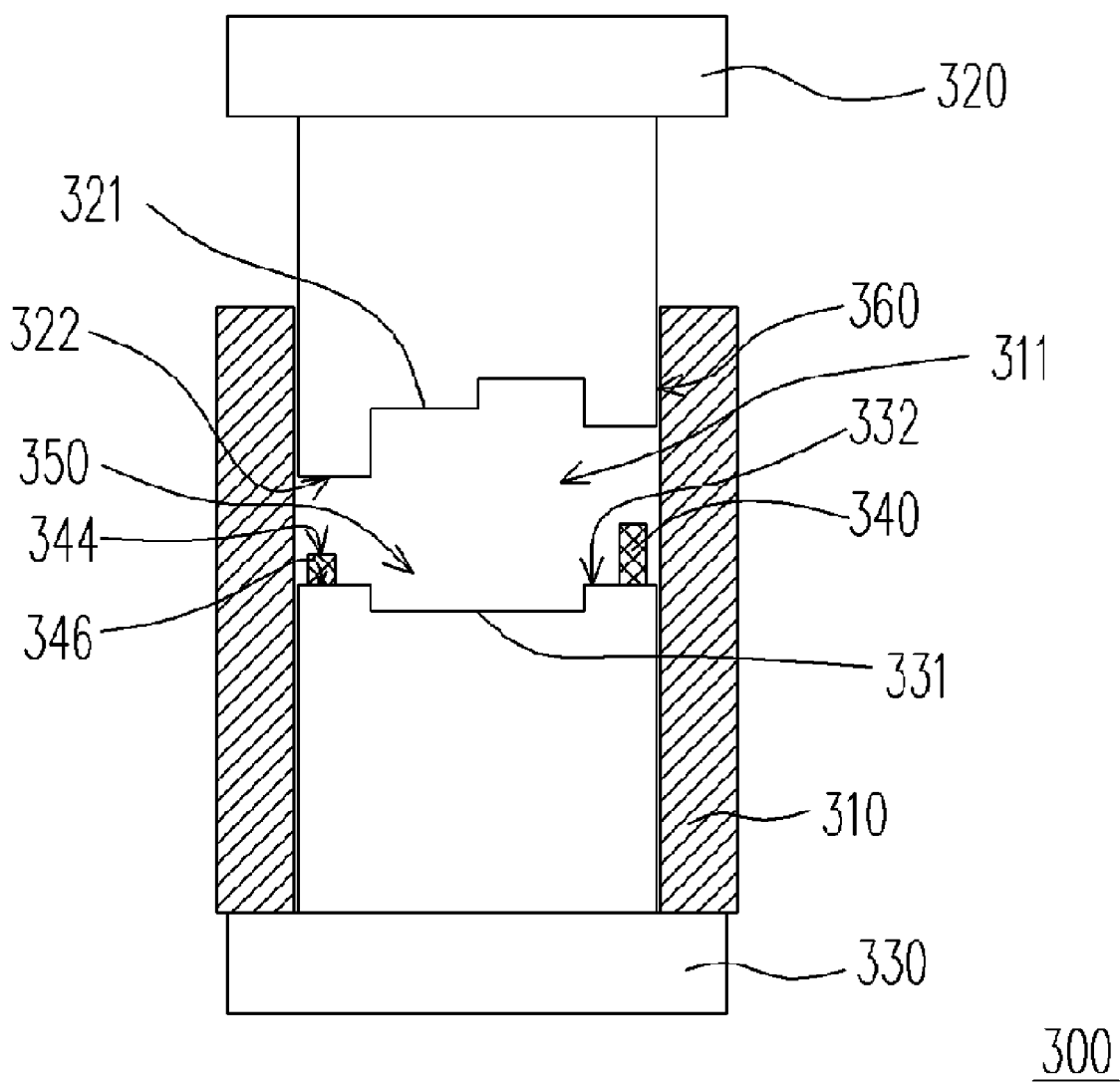
FIG. 7 is a schematic cross-sectional view showing the structure of a molding apparatus according to a second embodiment of the present invention.

FIG. 7 is a schematic cross-sectional view showing the structure of a molding apparatus according to a second embodiment of the present invention. As shown in FIG. 7, the precision molding apparatus 300 of the present embodiment is applied to form a mold object (not shown). The precision molding apparatus 300 comprises a mold assembly 310, an upper mold core 320, a lower mold core 330 and four correctional pads 340. The interior of the mold assembly 310 has a molding space 311. The upper mold core 320 and the lower mold core 330 face each other and have a corresponding upper mold portion 321 and a lower mold portion 332. The upper mold core 320, the lower mold core 330 and the mold assembly 310 together form a mold cavity 350 within the molding space 311. The four correctional pads 340 are disposed inside the mold cavity 350 around the lower mold portion 331 of the lower mold core 330. The correctional pads 340 have a coefficient of thermal expansion greater than the mold object, the upper mold core 320 and the lower mold core 330. In the process of forming the mold object, the two end surfaces 344, 346 of the correctional pads 340 are in contact with the respective end surface 322, 332 of the upper mold core 320 and the lower mold core 330 inside the mold cavity 350.

Figure 8:
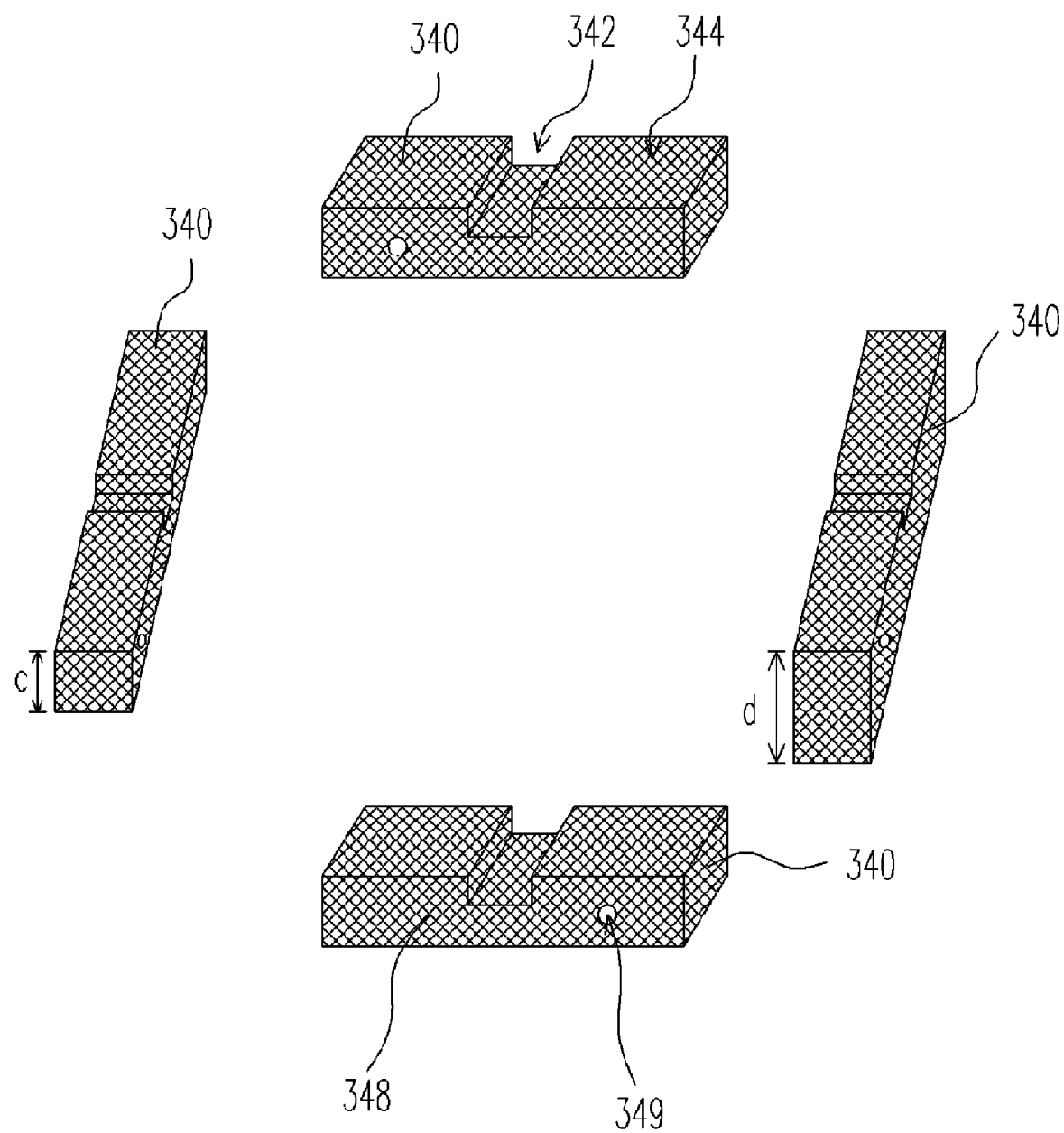
FIG. 8 is a perspective view showing the structure of correctional pads according to the present invention.

FIG. 8 is a perspective view showing the structure of correctional pads according to the present invention. As shown in FIGS. 7 and 8, the correctional pads 340 are fabricated using a metallic material or a metallic alloy. In general, the four correctional pads 340 are detachably disposed around the central mold object. Furthermore, the end surface 344 of each correctional pad 340 can have a gas-bleeding trench 342, or alternatively, the side surface 348 of each correctional pad 340 has a gas-bleeding hole 349. Both the gas-bleeding trench 342 and the gas-bleeding hole 349 can let go residual gases from the mold cavity 350. In the present embodiment, all the correctional pads 340 are detachable and the gap between neighboring correctional pads 240 can serve as an outlet for bleeding residual gases. Hence, it is not essential to provide either a gas-bleeding hole or a gas-bleeding trench.

In the aforementioned precision molding apparatus 300, a gap 360 exists between the upper mold core 320, the lower mold core 330 and the mold assembly 310 because of the need to provide tolerances. In general, the width of the gap 360 is between about 5~20 μm so that the upper mold core 320 and the lower mold core 330 can easily fit into the mold assembly 310. Although the presence of the gap 360 may lead to tilting when the upper mold core 320 is inserted into the mold assembly 310, the correctional pads 340 can correct the tilting in the upper mold core 320 and improves the face-tilting problem of the mold object. Ultimately, the mold object can have a higher precision. Furthermore, the thickness of the correctional pads 340 can be selected to match the shape of the upper mold core 320 and the lower mold core 330. For example, the thickness 'd' can be greater than the thickness 'c' to optimize the effect provided by the correctional pads 340.

Similarly, the coefficient of thermal expansion of the correctional pads 340 is greater than the mold object, the upper mold core 320 and the lower mold core 330. Hence, the degree of contraction in the correctional pads 340 is larger than the mold object, the upper mold core 320 and the lower mold core 330 in the cooling process. Therefore, the upper mold core 320 will continue to exert a pressure within the mold cavity 350 when the correctional pads 340 contract so that a secondary imprint effect is produced and mold contraction is minimized. Ultimately, the transfer precision of the mold object is improved.

It should be noted that the shape of the mold cavity shown in FIG. 7 is used for illustration only. The mold core can be modified into any shape according to the actual requirements. The shape of the correctional pads is also not limited to the one shown in FIG. 8. Within a reasonable range, the correctional pads can have a circular shape, a cubical shape and so on. Furthermore, the number of correctional pads, the size of each correctional pad and the thickness of each correctional pad can be modified to match a particular condition so that the most effective mold core correction and secondary surface imprint are produced.

In summary, the optical lens molding apparatus of the present invention uses a correctional ring to correct any tilting of the upper mold core so that face-tilting of the optical lens is minimized. Furthermore, the thickness of the correctional ring can be utilized to control the central thickness of the optical lens. In other words, the central thickness of the optical lens can be precisely controlled through a change in the thickness of the correctional ring. Moreover, the higher coefficient of thermal expansion of the correctional ring also enhances the secondary surface imprint effect and reduces mold shrinkage so that an accurate surface profile is transferred to the optical lens.

In addition, the precision molding apparatus of the present invention uses correctional pads to correct face tilting of a mold object. Similarly, the correctional pads also enhance secondary surface imprint effect and reduce mold shrinkage so that an accurate surface profile is transferred to the mold object.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical lens molding apparatus for forming an optical lens, the optical lens molding apparatus comprising:
   a cylindrical mold;
   a first mold core having a columnar shape disposed inside the cylindrical mold, wherein one end of the first mold core has a first molding portion and a first planar portion around the first molding portion;
   a second mold core having a columnar shape disposed inside the cylindrical mold, wherein one end of the second mold core has a second molding portion facing the first molding portion and a second planar portion facing the first planar portion such that a mold cavity is formed inside the cylindrical mold through the assembly of the first molding portion of the first mold core and the second molding portion of the second mold core inside the cylindrical mold; and
   a correctional ring disposed on the second planar portion of the second mold core and in contact with the first planar portion of the first mold core, wherein the correctional ring comprises a plurality of correctional units disposed in a circular configuration.

2. The optical lens molding apparatus of claim 1, wherein the inner diameter of the correctional ring is greater than the outer diameter of the optical lens and the outer diameter of the correctional ring is smaller than the inner diameter of the cylindrical mold.

3. The optical lens molding apparatus of claim 1, wherein the correctional ring has a thickness corresponding to the central thickness of the optical lens.

4. The optical lens molding apparatus of claim 1 wherein the correctional ring has at least a gas-bleeding trench.

5. The optical lens molding apparatus of claim 1, wherein two end surfaces of the correction rings are parallel to each other.

6. The optical lens molding apparatus of claim 1, wherein the correctional ring has a coefficient of thermal expansion greater than the optical lens.

7. The optical lens molding apparatus of claim 1, wherein the correctional ring has a coefficient of thermal expansion greater than the first mold core and the second mold core.

8. The optical lens molding apparatus of claim 1, wherein the material constituting the correctional ring is selected from a group consisting of metals and alloys.

9. The optical lens molding apparatus of claim 8, wherein the alloy comprises stainless steel.

10. The optical lens molding apparatus of claim 1, wherein the material of the optical lens is selected from glass and polymer.

11. A precision molding apparatus for forming an object, comprising:
 a mold assembly having an interior molding space;
 a first mold core with one end surface having a first molding portion;
 a second mold core facing the first mold core, wherein one end of the second mold core has a second molding portion such that a mold cavity is formed inside the molding space through the assembly of the first molding portion of the first mold core and the second molding portion of the second mold core inside the mold assembly; and
 a plurality of correctional pads disposed inside the mold cavity around the second molding portion of the second mold core such that two end surfaces of the correctional pad are in contact with the end surface of the first mold core and the second mold core within the mold cavity in the process of molding an object and that the correctional pads deforms to a greater extent than the mold object in the cooling process so that the first mold core and the second mold core together exert a pressure on the object, wherein the correctional pads are arranged in a circular configuration.

12. The precision molding apparatus of claim 11, wherein the correctional pad has a coefficient of thermal expansion greater than the mold object.

13. The precision molding apparatus of claim 11, wherein the correctional pad has a coefficient of thermal expansion greater than the first mold core and the second mold core.

14. The precision molding apparatus of claim 11, wherein the correctional pads surrounds the mold object.

15. The precision molding apparatus of claim 11, wherein the correctional pad has at least a gas-bleeding trench.

16. The precision molding apparatus of claim 11, wherein the correctional pad has at least a gas-bleeding hole.

17. The precision molding apparatus of claim 11, wherein the material constituting the correctional pad is selected from a group consisting of metals and alloys.

18. The precision molding apparatus of claim 17, wherein the alloy comprises stainless steel.

* * * * *